April 15, 1941.  C. W. McADAMS  2,238,655
CONVEYER
Filed Feb. 26, 1940
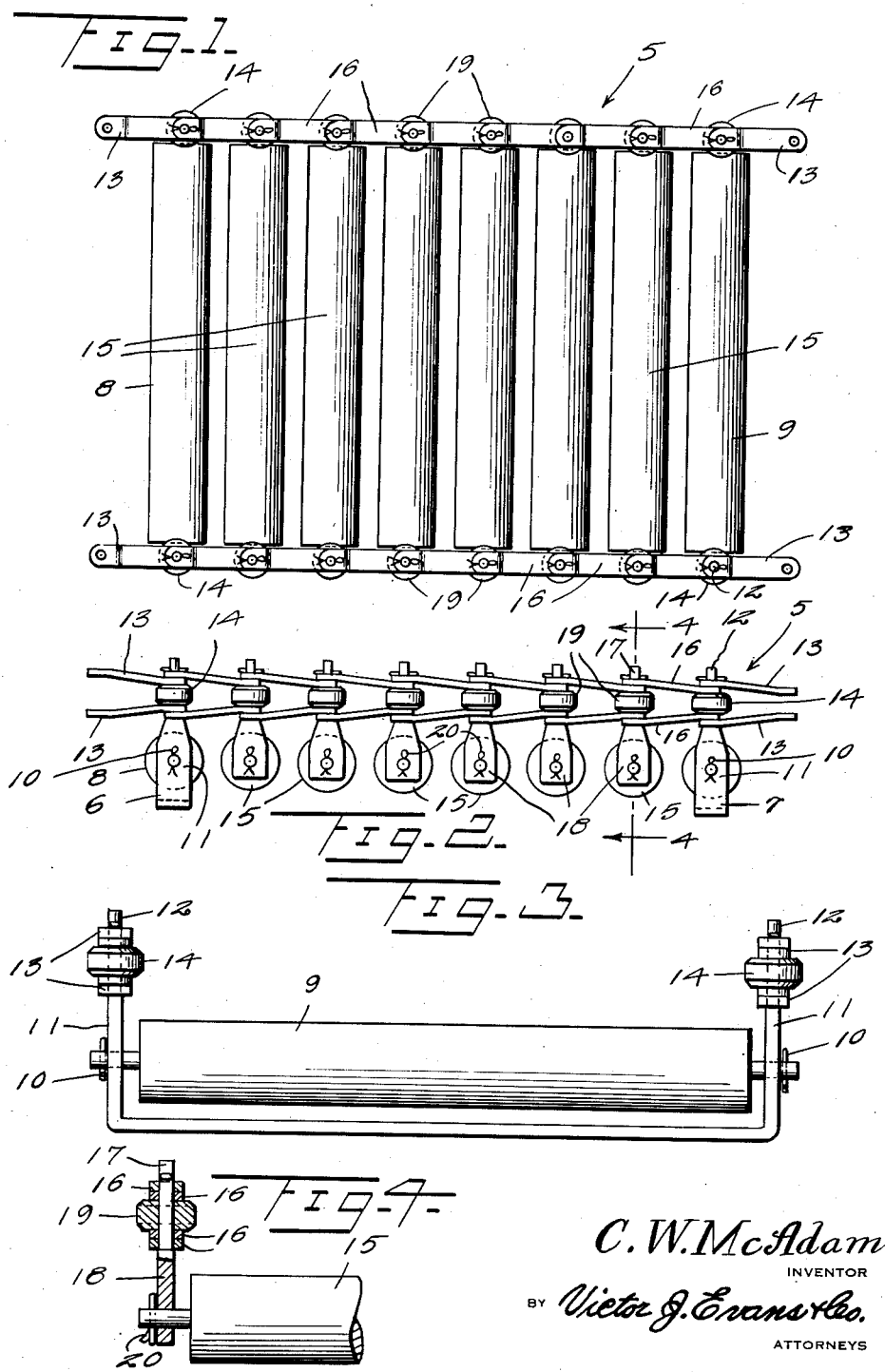

Patented Apr. 15, 1941

2,238,655

UNITED STATES PATENT OFFICE 2,238,655

CONVEYER

Clyde W. McAdams, Tampa, Fla.

Application February 26, 1940, Serial No. 320,924

3 Claims. (Cl. 193—35)

The present invention relates to conveyers, and more particularly to a conveyer which is laterally flexible to permit it to be adjusted to various curves and angles.

The primary object of the invention resides in the provision of a flexible gravity conveyer which is preferably constructed in sections of a predetermined length to be inserted where needed with a relatively rigid section of conveyer to form a curve or angle therein where desired.

Another object of the invention is to provide a conveyer having the above characteristics which comprises terminal yokes with conveyer rolls journalled in the ends thereof. Shafts are formed with and extend upwardly from the ends of the yokes to which are attached superposed link sections separated by means of a roller, a series of links extending longitudinally of the terminal yokes and mounted on shafts carrying rollers for separating the superposed series of links, said shafts also providing hangers forming bearings for supporting individual conveyer rolls in spaced relation between said terminal yokes.

The invention will be fully and comprehensively understood from a consideration of the following detailed description when read in connection with the accompanying drawing which forms a part of the application.

In the drawing:

Figure 1 is a top plan view of a flexible gravity conveyer embodying the features of the present invention.

Figure 2 is a side elevational view thereof.

Figure 3 is an end elevational view thereof.

Figure 4 is a detail sectional view taken substantially on line 4—4 of Figure 2.

In accordance with the present invention, a flexible unit of a predetermined length is constructed, the same comprising a series of spaced transversely extending conveyer rolls, the ends of which are journalled in flexible connections so as to assume various curves and angles when inserted in a line of rigid conveyer sections.

Referring to the drawing for a more detailed description thereof, the flexible conveyer unit is generally designated by the reference numeral 5 and comprises U-shaped end yokes 6 and 7, respectively, having journalled in the upwardly extending ends thereof transversely extending conveyer rolls 8 and 9, respectively. Cotter pins 10 or similar means are employed for locking the shafts of the rollers in the end walls 11 of said yokes.

The end walls 11 have their upper portions reduced in diameter to form shafts 12 which support thereon superposed links 13, said links being freely movable in a lateral direction on said shafts. The links 13 are separated by means of rollers 14 journalled on the shaft 12 as more clearly shown in Figure 2 of the drawing.

A series of intermediate conveyer rolls 15 disposed in spaced relation between the end rolls 8 and 9 are also provided in the unit 5 and are supported in the following manner. Extending forwardly of the end yoke 7 is a pair of superposed links 16, one end of which is supported on the shaft 12 between the links 13. The opposite ends of the links 16 are disposed on a shaft 17, the bottom end 18 of which forms a hanger for one of the intermediate rolls 15. A roller 19 is mounted on the shaft 17 and separates the links 16. As more particularly shown in Figure 4 of the drawing, the ends of the conveyer rolls 15 are journalled in openings formed in the hangers 18 and are held therein by means of cotter pins or the like 20. The entire unit is made up in the manner just described comprising a series of similar links 16 and spaced rollers 19 mounted on individual shafts 17, the lower end of which forms hangers 18.

The links being individually mounted are readily adjustable for forming various curves and angles in the unit and the rollers 14 and 19 also serve as a guard to guide articles being moved on the conveyer. The respective conveyer rolls 8, 9 and 15 being individually mounted on the respective yokes 6, 7 and hangers 18 will readily follow the desired curve being formed in the conveyer.

The end links 13 are to be attached in the conveyer line by any desired means and may be attached to a rigid conveyer unit or to a similar flexible conveyer unit. It will be noted that the links and rollers are disposed above the conveyer rolls and form a substantially continuous guard rail to guide articles being moved on the conveyer.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A flexible conveyer unit of the character described, comprising, hangers at each end of said unit, each hanger comprising a cross bar having upwardly turned ends, a conveyer roll mounted in each of said hangers, the upper portion of said hanger ends forming a shaft for mounting superposed links thereon, guard rollers mounted on said ends between said links, a series of spaced conveyer rolls disposed between said end hangers, and means for flexibly mounting said latter conveyer rolls.

2. A flexible conveyer unit of the character described, comprising, hangers at each end of said unit, each hanger comprising a cross bar having upwardly turned ends, a conveyer roll mounted in each of said hangers, the upper portion of said hanger ends forming a shaft for mounting superposed links thereon, a series of spaced conveyer rolls disposed between said end hangers, a multiplicity of united spaced superposed links disposed between said end hangers and arranged in series with said first-mentioned links, the ends of said links being mounted on spaced vertical shafts, and means forming a part of said shafts for mounting said series of spaced conveyer rolls.

3. A flexible conveyer unit of the character described, comprising, hangers at each end of said unit, each hanger comprising a cross bar having upwardly turned ends, a conveyer roll mounted in each of said hangers, the upper portion of said hanger ends forming a shaft for mounting superposed links thereon, a series of spaced conveyer rolls disposed between said end hangers, a multiplicity of united spaced superposed links disposed between said end hangers and arranged in series with said first-mentioned links, the ends of said links being mounted on spaced vertical shafts, spacing rollers mounted on said shafts between the ends of said links, and means forming a part of said shafts for mounting said series of spaced conveyer rolls.

CLYDE W. McADAMS.